United States Patent
Britt et al.

(10) Patent No.: US 11,253,837 B2
(45) Date of Patent: Feb. 22, 2022

(54) POST-SYNTHETICALLY MODIFIED METAL-ORGANIC FRAMEWORKS FOR SELECTIVE BINDING OF HEAVY METAL IONS IN WATER

(71) Applicant: The Regents of the University of California, Oakland, CA (US)

(72) Inventors: David Britt, El Cerrito, CA (US); Daniel Sun, Sion (CH); Wendy Queen, Grimisuat (CH)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 460 days.

(21) Appl. No.: 16/160,629

(22) Filed: Oct. 15, 2018

(65) Prior Publication Data

US 2019/0046955 A1    Feb. 14, 2019

Related U.S. Application Data

(63) Continuation of application No. PCT/US2017/028865, filed on Apr. 21, 2017.

(60) Provisional application No. 62/326,475, filed on Apr. 22, 2016.

(51) Int. Cl.
*B01J 20/22* (2006.01)
*B01J 20/28* (2006.01)
*C02F 1/28* (2006.01)
*C02F 101/20* (2006.01)

(52) U.S. Cl.
CPC ....... *B01J 20/226* (2013.01); *B01J 20/28033* (2013.01); *C02F 1/281* (2013.01); *C02F 1/285* (2013.01); *C02F 2101/20* (2013.01)

(58) Field of Classification Search
CPC .... B01J 20/22; B01J 20/226; B01J 20/28033; C02F 1/285; C02F 2101/20
USPC ....................................... 502/401
See application file for complete search history.

(56) References Cited

U.S. PATENT DOCUMENTS

| | | | |
|---|---|---|---|
| 8,742,152 B2 | 6/2014 | Yaghi et al. | |
| 8,795,412 B2 | 8/2014 | McGrail et al. | |
| 8,852,320 B2 | 10/2014 | Yaghi et al. | |
| 9,512,145 B2 | 12/2016 | Yaghi et al. | |
| 9,675,958 B2 | 6/2017 | Kang et al. | |
| 9,861,953 B2 | 1/2018 | Long et al. | |
| 2010/0081186 A1 | 4/2010 | Lee et al. | |
| 2010/0273642 A1 | 10/2010 | Chang et al. | |
| 2014/0294709 A1 | 10/2014 | Long et al. | |
| 2015/0235721 A1 | 8/2015 | Grandjean et al. | |
| 2015/0192548 A1 | 9/2015 | Wilkinson et al. | |
| 2015/0369746 A1 | 12/2015 | Azzazy et al. | |

FOREIGN PATENT DOCUMENTS

| | | |
|---|---|---|
| CN | 102249363 | 11/2011 |
| CN | 102949980 A1 | 3/2013 |
| CN | 103157442 | 6/2013 |
| WO | 2013122334 | 8/2013 |

OTHER PUBLICATIONS

Ke et. al., "Thiol-functionalization of metal-organic framework by a facile coordination-based postsynthetic strategy and enhanced removal of Hg2+ from water." Journal of Hazardous Materials, vol. 196, pp. 36-43, Sep. 3, 2011.

Khan et. al., "Adsorptive removal of hazardous materials using metal-organic frameworks (MOFs): A review." Journal of Hazardous Materials, vols. 244-245, pp. 444-456, Nov. 13, 2012.

Fang et. al., "Functional Mesoporous Metal-Organic Frameworks for the Capture of Heavy Metal Ions and Size-Selective Catalysis." Inorganic Chemistry, vol. 49, No. 24, pp. 11637-116-42, Nov. 17, 2010.

Zhang et. al., "Photoinduced Postsynthetic Polymerization of a Metal-Organic Framework toward a Flexible Stand-Alone Membrane**." Angewandte Chemie, vol. 127, pp. 4333-4337, Mar. 3, 2015.

Zhang et. al., "Selective removal of transition metal ions from aqueous solution by metal-organic frameworks." Royal Society of Chemistry, vol. 5, pp. 72107-72112, Aug. 19, 2015.

International Search Report and Written Opinion for International Application No. PCT/US17/28865 dated Jul. 31, 2017.

*Primary Examiner* — Edward M Johnson
(74) *Attorney, Agent, or Firm* — O'Banion & Ritchey LLP; John P. O'Banion

(57) ABSTRACT

A composition of matter for selective binding of at least one heavy metal comprising at least one porous metal-organic framework (MOF) with unsaturated coordination sites, at least one organic ligand functionalized with at least one functional group tailored to bind to the at least one MOF, and at least one separate functional group tailored to bind to the at least one heavy metal.

19 Claims, 6 Drawing Sheets

M-BTTri
M = Mn, Fe, Co, Cu

MIL-100
M = V, Cr, Fe, Al

NH$_2$-MIL-125
M = Ti

M$_2$(dobpdc)
M = Mg, Mn, Fe, Co, Ni, Zn

UIO-66
M = Zr, Hf

POST-SYNTHETICALLY MODIFIED METAL-ORGANIC FRAMEWORKS FOR SELECTIVE BINDING OF HEAVY METAL IONS IN WATER

CROSS REFERENCE TO RELATED APPLICATIONS

This application is a continuation of International Application Number PCT/US2017/028865, filed Apr. 21, 2017, which claims priority to U.S. Provisional Patent Application No. 62/326,475, filed Apr. 22, 2016, both of which are herein incorporated by reference.

STATEMENT OF GOVERNMENTAL SUPPORT

This invention was made with government support under Contract No. DE-AC02-05CH11231 awarded by the U.S. Department of Energy. The government has certain rights in this invention.

BACKGROUND OF THE INVENTION

Field of the Invention

The present invention relates to the field of post-synthetically functionalized metal-organic frameworks (MOFs).

Related Art

With widespread use of fresh water in various industries there is increasing public health concern associated with water contamination by heavy metals. Human exposure has risen dramatically in recent years as a result of an up surge in energy production and an exponential increase in heavy metal use in several industries. With an estimated 1 billion people without access to clean drinking water and 2 million casualties per year, water contamination is one of the world's leading causes of death. Further, the World Health Organization estimates that continued climate change, will afford as much as half of the world's population with limited access to clean water. With all of this and the water-energy nexus, limitations in the amount of available water will be detrimental to human health and certainly also impose a strain on future energy production.

Because of their high degree of toxicity, Cd, Cr, Pb, Hg, and As are of greatest concern; these metals, which play no role in human homeostasis, induce multiple organ damage, cause birth defects, and are classified carcinogens. Further, over exposure to metals that serve as essential nutrients required for various biochemical and physiological functions, as in the case of Zn and Cu, can also lead to cellular damage and disease. Water quality is particularly bad in developing and underdeveloped countries where a lack of resources and awareness limit a sufficient level of industrial wastewater treatment. In many regions of the world, as in Liaoning Province in China, water sources have turned yellow from high concentrations of hexavalent Cr, and in Cambodia, water supplies are littered with Pb and Hg. Recent media attention has shown extensive pollution even in several well-developed countries.

For example, recent findings in Switzerland report large amounts of Hg contamination that stretches 11-kilometers along a canal, a direct result of industrial activity between 1930 and 1970. Further, a group of researchers from Virginia Tech have helped to uncover an extensive amount of residential water contamination in Flint Michigan where some sources were found to contain Pb, a potent neurotoxin, at concentrations higher than 10,000 ppb, a level that is over 2000 times what is considered to be acceptable. Further, experts anticipate that the US water crisis goes way beyond the problems recently found in Flint Michigan. Solutions for the energy efficient production of clean potable water are imperative for environmental and human well-being.

Conventional water purification treatments for heavy metals are comprised of a variety of methods such as ion exchange, chemical precipitation, membrane systems, liquid extraction, and adsorption. Of these, adsorption is particularly attractive due to low-cost, ease of use, and high effectiveness. Current adsorption technologies include zeolites, mesoporous silicas, activated carbons and polystyrenesulfonates. Although some of these materials have been implemented in water treatment processes, they have significant drawbacks that include lack of chemical tunability and low capacities and selectivities; it is thought that these problems can be alleviated through the use of water stable metal-organic frameworks (MOFs), a relatively new class of porous materials that consist of metal ions or metal-ion clusters interlinked by organic ligands.

MOFs are a particularly attractive class of porous adsorbent materials that have quickly moved to the forefront of science due to unprecedented internal surface areas, easy chemical tunability, and strong, selective binding of a host of guest species. As such, MOFs are under intense investigation for gas separations, gas storage, and catalysis. Through judicious selection of the ligand and metal, which control pore size/shape and MOF-guest interactions, MOF uptake properties such as selectivity, can be tuned. The molecular nature of the organic ligands within the hybrid organic/inorganic newcomers permits a modular approach to their design and further allows the introduction of multifunctional properties. The assembly of these predesigned building blocks is a powerful tool for the development of new solid materials because it yields architectures not only with regular, well-defined inner structures, but also with tailored functionalities on their internal surface to achieve specified function. In these ways MOFs, relative to their all-inorganic counterparts, offer unmatched opportunities to achieve optimal efficiencies for many environmentally relevant applications.

There has been little work that reports the use of MOFs for the treatment of heavy metals in water; this is primarily due to the widespread belief that MOFs are unstable in the presence of water, a result of many reports that show frameworks that break down due to hydrolysis. While MOFs do exhibit coordination type bonding, that is considered to be weaker than that of its covalent counterpart, there have been many MOFs synthesized to date that exhibit water stability. This effort has been driven by the need for materials that maintain high performance in wet environments, such as post-combustion flue gas separations. Many synthetic strategies have been taken to improve the bonding strength between building units including the incorporation of high oxidation state metals, metal nodes with large coordination numbers, and ligands with high pKa's, like pyrazoles and imidazoles. The attraction to deploy MOFs in water purification technologies is related to their facile chemical tunability allowing their internal surface to be decorated with high densities of strong adsorption sites for heavy metal cations and, as a result, more control over their capacities and selectivities.

Given the aforementioned needs, we have set out to explore MOFs for water purification. We aim to utilize frameworks with (i) proven water stability and (ii) the potential to undergo surface functionalization to decorate their internal surface with heavy metal scavengers, either through the use of functionalized framework struts or through the surface appendage of organic molecules that have the desired functionality (see FIG. 1). It is hypothesized that MOFs with the aforementioned properties could reversibly bind heavy metals with high capacities and selectivities making them paramount in a variety of water purification applications, a mission of strong global relevance. We will, for the first time, give insight into their structure-derived function pertaining to heavy metal binding. With this knowledge we intend to inform the design of MOFs with adsorption properties that are optimized for various wastewater mixtures. The second project is focused on employing photoactive MOFs in the reduction of $Cr^{6+}$ to $Cr^{3+}$; the latter is approximately 500 times less toxic and offers lower mobility in water solutions allowing easier removal via adsorption or chemical precipitation. A detailed description of the goals, objectives, methodologies, and impact of the proposed work are described in the detailed description of the invention.

SUMMARY

One innovative aspect of the subject matter described in this disclosure can be implemented in a composition of matter for selective binding of at least one heavy metal. The composition of matter comprises at least one porous metal-organic framework (MOF) with unsaturated coordination sites, at least one organic ligand functionalized with at least one functional group tailored to bind to the at least one MOF, and at least one separate functional group tailored to bind to the at least one heavy metal.

In some implementations, the at least one MOF comprises MIL-100, MIL-101, MIL-125, $M_2$(dobdc), $M_2$(dobpdc), Cu-BTTri, M-TDPAT, $NH_2$-MIL-125, UIO-66, UIO-67, or M-BTTri. In some implementations, the at least one MOF is treated with at least one binder to adjust particle properties comprising size or hardness.

Another innovative aspect of the subject matter described in this disclosure can be implemented in a device. The device comprises the composition of matter described above in the Summary. A liquid is flowed across a packed bed of the composition of matter.

Another innovative aspect of the subject matter described in this disclosure can be implemented in a device. The device comprises the composition of matter described above in the Summary. The composition of matter is incorporated into a membrane, across which a liquid is flowed.

Another innovative aspect of the subject matter described in this disclosure can be implemented in a device. The device comprises the composition of matter described above in the Summary. The composition of matter is coated onto at least one transducer. The at least one transducer is used to measure the concentration of one or more heavy metals in a liquid sample. In some implementations, multiple transducers are used to measure the concentration of one or more heavy metals in the liquid sample.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
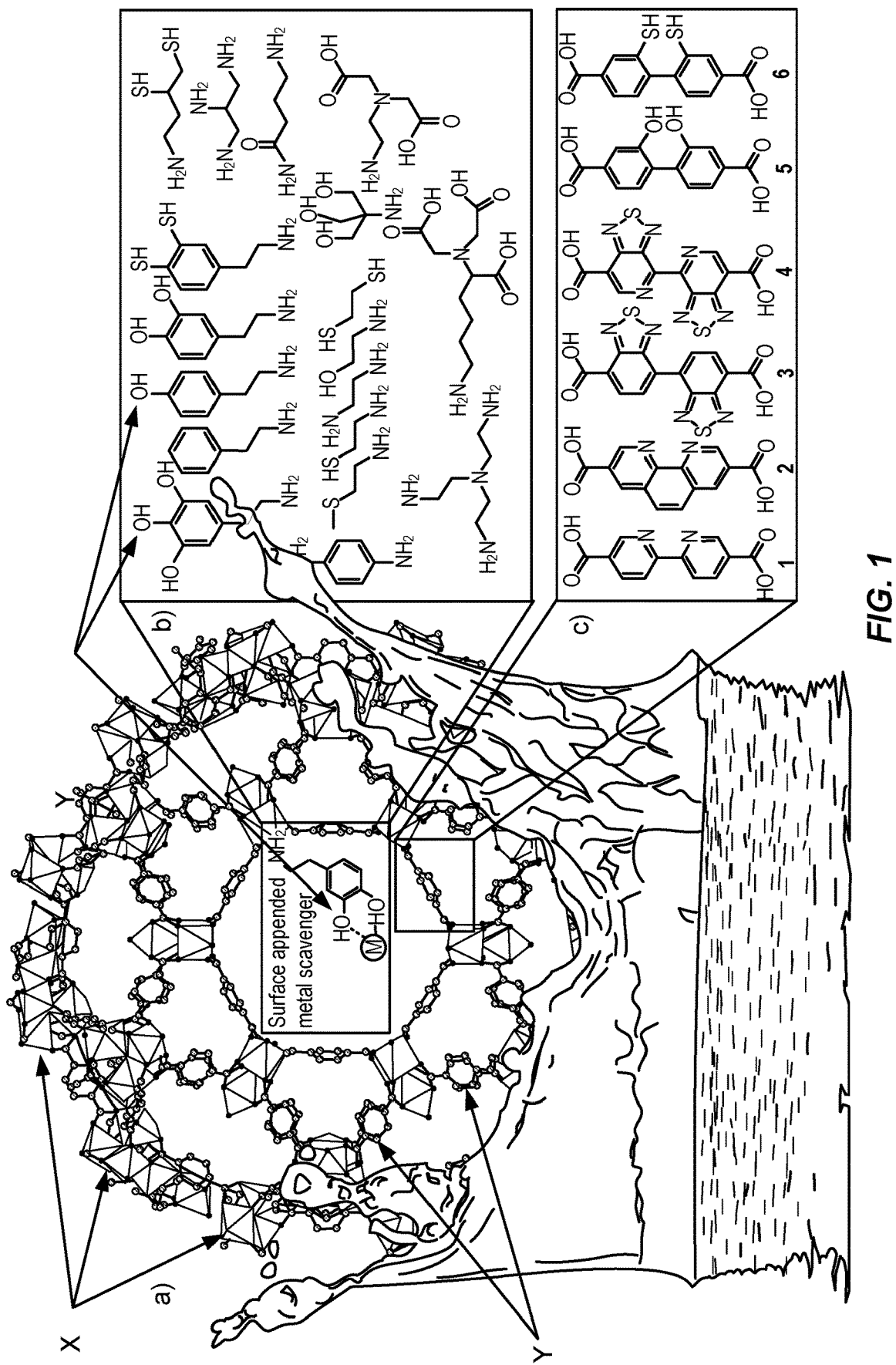
FIG. 1 illustrates a MIL-101 framework with a surface appended molecule, dopamine. For the framework, metal, oxygen, and carbon are called out as "X", "Y", and "Z", respectively. The panel labeled (b) illustrates a library of potential metal scavenging molecules to be appended to open metal sites on framework surfaces. The panel labeled (c) illustrates several candidate ligands to be used as framework struts that can bind heavy metal cations.

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Various embodiments of the invention relate to remediation of water contaminated by heavy metals, such as Pb, Hg, Cd, Ni, etc. Various embodiments of the invention describe a class of materials capable of selectively taking up these metals based on post-synthetically functionalized metal-organic frameworks (MOFs). MOFs are a class of microporous material that has generated interest for a variety of applications. Their high internal surface area makes them an ideal candidate for uptake of ions.

However, a typical MOF has no chemical groups that will selectively bind a given ion in large amounts. Various embodiments of the invention describe a class of materials achieved by post-synthetically introducing a ligand that binds to the MOF at one point and to metal ions at another. We have demonstrated that one member of this class of materials can take up 60% of its own weight in lead ions, an impressive number.

One particular experiment was performed using water collected from a natural source rather than purified water. Thus, we have demonstrated selectivity against ions normally present in water, such as calcium and magnesium. The materials we describe herein are constructed from low cost components, making them potentially appropriate for large-scale cleanup efforts.

Selectivity to other ions, such as Ca and Mg, is a big problem for existing water purification materials (mostly ion-exchange resins). Another problem is that large organic molecules, such as humic acid, typically clog the pores of these resins over time. The pores in MOFs are too small to admit that type of molecule, so they are unlikely to suffer from the same deficiency.

Furthermore, MOFs can be incorporated into sensing devices, which opens up an additional application: direct sensing of heavy metal ions in water on a low cost, disposable sensor.

Our initial aim was to develop a class of MOF materials that could be used to bind a desired metal ion in order to do further chemistry at that site (e.g. catalysis). We realized that the same material could be used to bind unwanted metal ions in a water sample, so we tested the ability of one of the materials to do that.

There are several methods that are all unsatisfactory. They generally involve using a nonselective chelating agent, which is typically a polymer resin but can also be a molecule in solution. The problem is that these agents bind indiscriminately. Water already contains many Ca, Mg, and Fe ions, so those ions saturate the material quickly. As a result, much more material than necessary must be used. Furthermore, a cleanup effort will also remove desirable metal ions from the water.

With 1 billion people having limited access to clean drinking water and the expectation that continued climate change will significantly decrease human access to freshwater supplies, there is a clear need for new materials that can purify large quantities of water and in a an energetically feasible way.

Given this and the water-energy nexus, the proposed work is focused on the exploration of metal-organic frameworks (MOFs) for water purification technologies. MOFs, a relatively new class of porous materials constructed by metal-ions or metal-ion clusters interlinked by organic ligands, have quickly moved to the forefront of science due to their high internal surfaces areas, facile chemical tunability, and strong, selective binding of a large number of guest species. MOFs, relative to their all-inorganic counterparts, offer unmatched opportunities to achieve optimal efficiencies for many environmentally relevant applications.

In our recent work, efforts were made to append organic molecules into MOF structures affording frameworks that can selectively extract metal-ions from water solutions and in capacities that rival current purification technologies. Given the novel results and the limited work in the MOF field concerning water purification, the proposal is focused on creating functionality on the internal surface of water stable MOF structures for the adsorption of heavy metals (including $Hg^{2+}$, $Cd^{2+}$, $Pb^{2+}$, $As^{3+}$, $Cr^{6+}$, $Zn^{2+}$, $Ni^{2+}$, and $Cu^{2+}$) from water solutions. One large gap in research related to hybrid organic/inorganic frameworks pertains to the inability to rationally design materials with targeted structural features and hence properties. As such, one of the underlying goals of our work is to understand on a molecular level what makes a material more ideal for heavy metal extraction and then employ that knowledge for the deliberate design of materials with enhanced properties.

This work is focused on decorating the internal surface of MOFs with heavy metal scavengers, either through the use of functionalized framework struts or through the surface appendage of organic molecules that possess the desired functionality. The chosen frameworks will have proven water stability and the potential to undergo surface functionalization.

It is hypothesized that MOFs with the aforementioned properties could reversibly bind heavy metals with high capacities and selectivities making them paramount in a variety of water purification applications, a mission of strong global relevance. We will, for the first time, give insight into the structure-derived function of MOFs pertaining to heavy metal binding with the ultimate goal aimed at developing materials that can be precisely designed, with varying surface functionality, for the purification of an assortment of different wastewater mixtures that result from various industries.

Metal Adsorption in MOFs with Metal Scavenging Struts and Appendages

Goal:

To decorate the internal surface of porous crystalline materials with metal scavenging groups; large families of porous frameworks with slightly varying structural features were studied in order to elucidate structure-property relationships. This approach will provide the knowledge necessary to tune important properties such as metal selectivity and adsorption capacity for the effective extraction of heavy metals ions (including $Hg^{2+}$, $Cd^{2+}$, $Pb^{2+}$, $As^{3+}$, $Cr^{6+}$, $Zn^{2+}$, $Ni^{2+}$, and $Cu^{2+}$) leading to the eventual implementation of MOFs into water treatment technologies. The ultimate goal is to develop materials that are precisely designed, with varying surface functionality, for the removal of predefined mixtures of heavy metals that might result from various industries. The modular nature of MOF chemistry provides a significant advantage relative to other porous counterparts.

Figure 2:
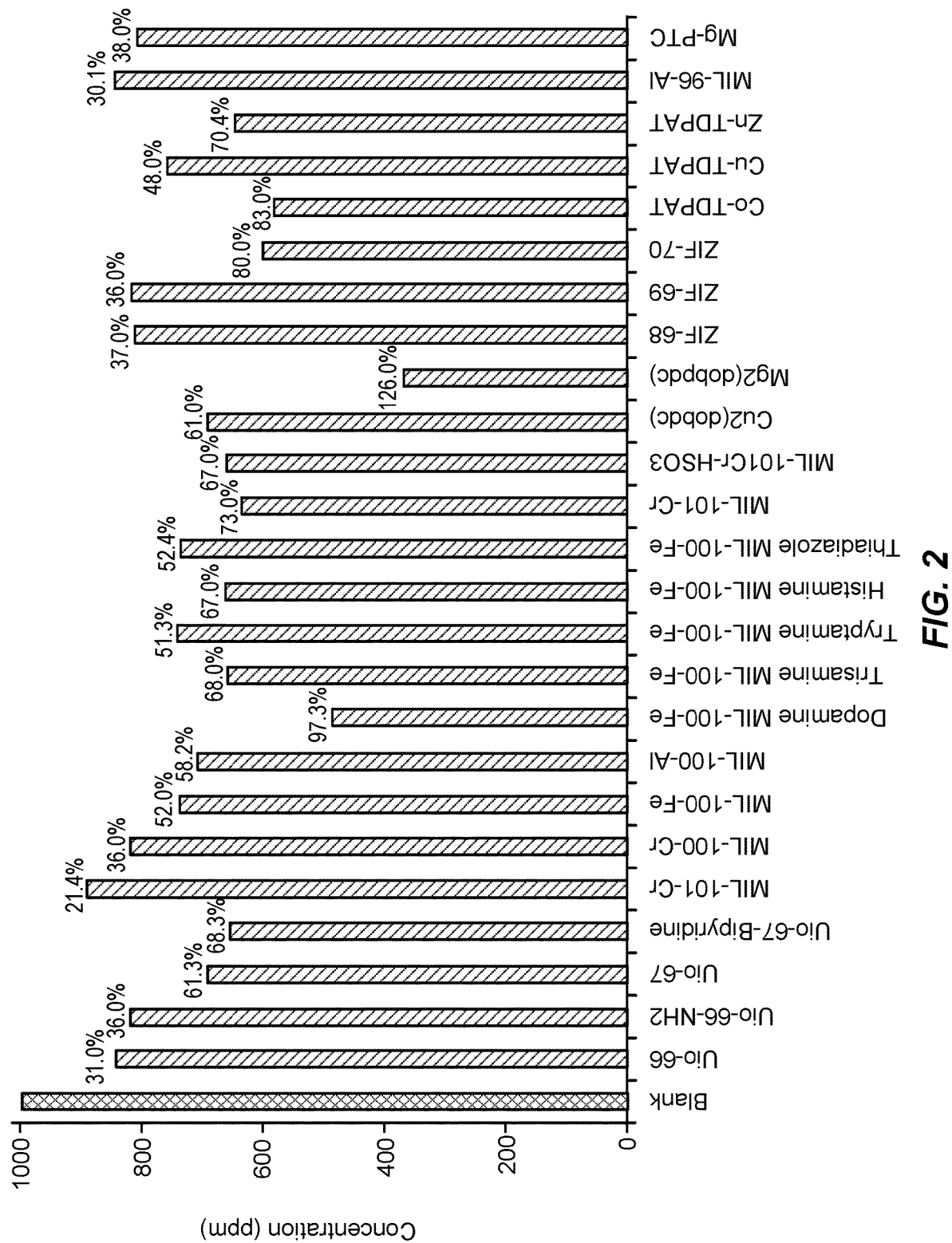
FIG. 2 illustrates many metal-organic frameworks that we have screened for $Pb^{2+}$ adsorption. It should be noted that most of the frameworks are unfunctionalized and it is expected that we can significantly improve the uptake with surface functionalization. Results are shown for the as-prepared MIL-100-Fe framework and several functionalized analogs. We see a significant improvement in the $Pb^{2+}$ uptake with dopamine, histamine, and trisamine. For these experiments, 10 mg of each framework was soaked in 20 mL of $Pb(CH_3COO)_2$ solution. Values above each bar plot represent the wt % of $Pb^{2+}$ taken up by the framework (mg $Pb^{2+}$/mg framework).

Results:

With limited work in water treatment and the common belief that MOFs are not water stable, we have provided a study showing Pb adsorption in several well-known metal-organic frameworks, (see FIG. 2). Our findings reveal several existing framework families that have the capability to adsorb significant amounts of $Pb^{2+}$ (see FIG. 2); some of the observed capacities are competitive or higher than current adsorbents on the market such as activated carbons (60 wt %). As such, we have set out to see if they can provide selectivity in metal adsorption and further probe whether surface functionalization can be used to enhance the adsorption capacity. As an example, we have chosen to further study MIL-100 described by Horcajada et. al., "Synthesis and catalytic properties of MIL-100(Fe), an iron(iii) carboxylate with large pores" *Chemical Communications* 2007, (27), 2820-2822. (See also FIG. 4), a framework known to exhibit high thermal and chemical stability, earth abundant metals, and a commercially available ligand. Our results indicate that the MIL-100-Fe framework has a capacity of approximately 52 wt % Pb (mg Pb/mg MIL-100-Fe at a starting concentration of 1000.6 ppm Pb) (see FIG. 2). As a proof of concept, after framework synthesis, the material was heated under vacuum to remove solvent, and free base dopamine was appended to 30% of the $Fe^{3+}$ sites as determined by combustion analysis.

Figure 3A:
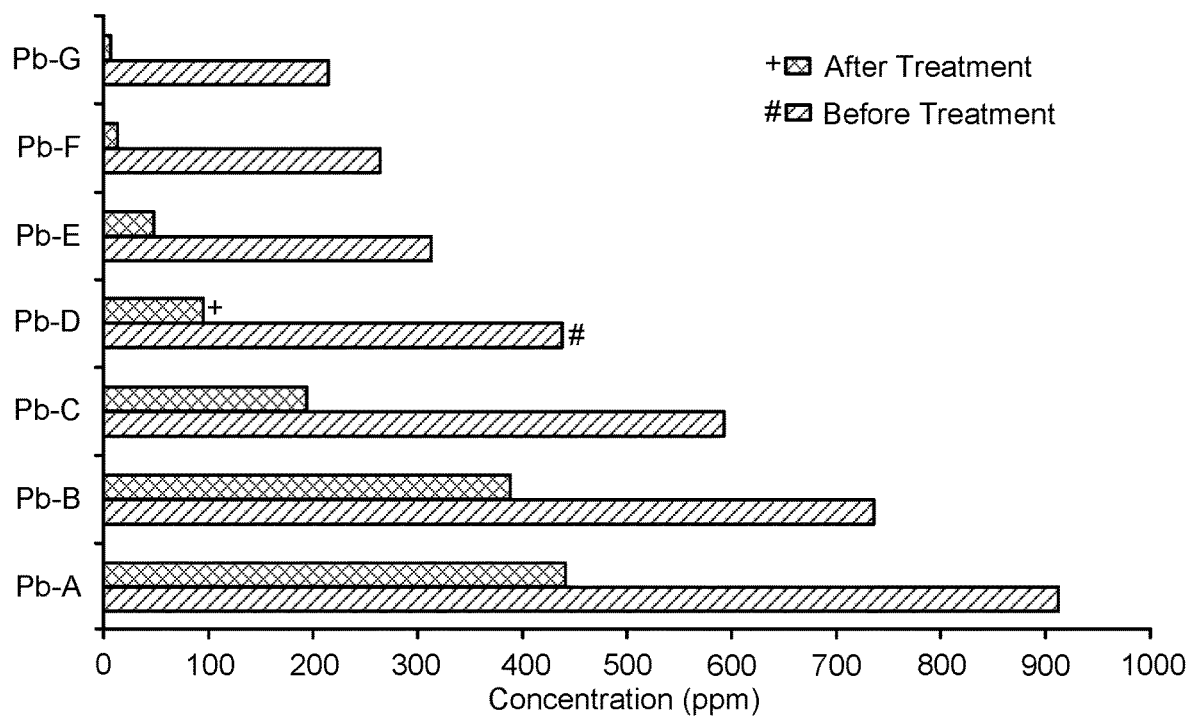
FIG. 3A illustrates concentrations of $Pb^{2+}$ and FIG. 3B illustrates concentrations of $Cu^{2+}$ in contaminated water samples before and after treatment with the dopamine-MIL-100-Fe framework. For each experiment, 10 mg of activated sample was soaked in 20 mL of river water that contained varying amounts of $Pb^{2+}$ or $Cu^{2+}$. The amount of metal loaded into the water is denoted with a pound (#) symbol and the amount remaining after MOF treatment is denoted with a plus (+) symbol ($Pb^{2+}$) and a dollar sign ($) symbol ($Cu^{2+}$).
Figure 3B:
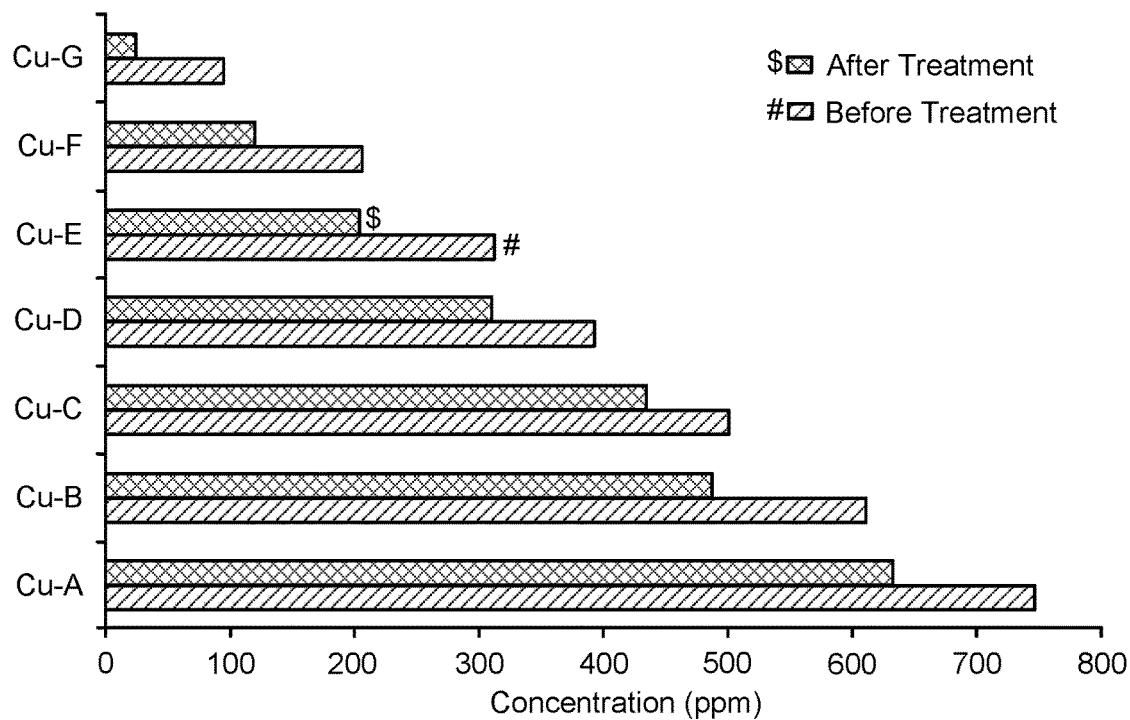

A Prussian blue test performed on both MIL-100-Fe and dopamine-MIL-100-Fe showed the existence of free —OH groups only in the dopamine-appended analog. While this result supports the idea that the appendage likely occurs through the amine functionality leaving the catechol available to bind the metals in solution, further experimental evidence is needed. To examine the materials capabilities regarding heavy metal adsorption at varying concentrations, fresh water supplies were taken from a nearby river and known amounts of several heavy metal containing salts ($Pb^{2+}$, $Cr^{6+}$, $Cu^{2+}$, $Ni^{2+}$, and $Cd^{2+}$) were added. The MIL-100-Fe and dopamine-MIL-100-Fe analog were soaked in contaminated water samples overnight. Multiple tests revealed that the dopamine-MOF offers a high capacity for the adsorption of both $Pb^{2+}$ and $Cu^{2+}$, with 4.2 mmol/g (97 wt %) and 3.6 mmol/g (23 wt %) uptake, respectively (see FIG. 2 and FIGS. 3A, 3B), with minimal adsorption of the other metals. The dopamine-functionalized framework was able to remove over 99.5% of $Pb^{2+}$ and $Cu^{2+}$ from the contaminated water samples and further tests are underway to determine the lowest achievable concentrations after MOF treatment. The capacity for $Pb^{2+}$ adsorption in dopamine-MIL-100-Fe is on the order of 3.0 times that of other reported MOFs and exceeds many of the best reported materials, such as activated carbon. Since this experiment, the amount of appended dopamine has been further optimized from 30% to 65% of the $Fe^{3+}$ sites and is expected to bring the capacity to a significantly higher value. While further testing is needed to assess the lifetime and cycleability of the material, this MOF has shown no sign of leaching after soaking in water for several days as determined by ICP and NMR. Powder x-ray diffraction and surface area measurements also reveal that the structural integrity is maintained. It should be noted that we see a significant increase in $Pb^{2+}$ capacity with trisamine and histamine appendage in MIL-100-Fe as well (see FIG. 2). Given our novel results and the clear need for new advanced materials that can purify large quantities of water and in an energetically feasible way, we propose to explore these materials for applications related to waste water treatment and in home water purification systems.

Post-Synthetic Appendage of Heavy Metal Scavengers Inside MOFs.

For the first part of the proposed work, frameworks that have demonstrated water stability and open metal-coordination sites (OMCs) were explored. The latter was used to postsynthetically append a variety of molecules (see FIG. 1) that have at least two Lewis base functionalities, (i) one that allows an interaction with the existing OMCs, anchoring them onto the internal surface of the MOF, and (ii) a second to selectively bind common metal contaminates found in water (as previously demonstrated in the case of dopamine-MIL-100-Fe). While the idea of surface functionalization is not a new one, to the best of our knowledge the idea to use these methods for water treatment has been previously demonstrated only once by Zhu et al who post-synthetically modified a Cu-containing MOF (HKUST-1) with 1,2-ethanedithiol. While the materials exhibited a high adsorption capacity for Hg in water (capacity of 714.3 mg $Hg^{2+}$/g MOF), chemical stability of HKUST-1 in water is lacking and thus it is also ineffective for cycling.

FIG. 1 illustrates MIL-101 framework with a surface appended molecule, dopamine. For the framework, metal, oxygen, and carbon are called out as "X", "Y", and "Z", respectively. The panel labeled (b) illustrates a library of potential metal scavenging molecules to be appended to open metal sites on framework surfaces. The panel labeled (c) illustrates several candidate ligands to be used as framework struts that can bind heavy metal cations.

Figure 4:
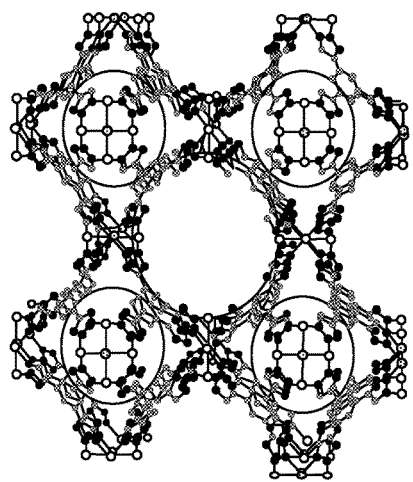
FIG. 4 illustrates frameworks of interest that have reported water stability. The available metals for each framework is shown; this does not mean that all metal analogs will be explored for water purification. In most cases we will try to use low cost, earth abundant metals for framework synthesis. M-BTTri, MIL-100, $M_2$(dobpdc) will be used for surface appended metal scavengers as they have open metal sites. MIL-125 and UIO-66 are examples of frameworks that we will try to make isostructural frameworks with metal scavenging struts.
Figure 4:
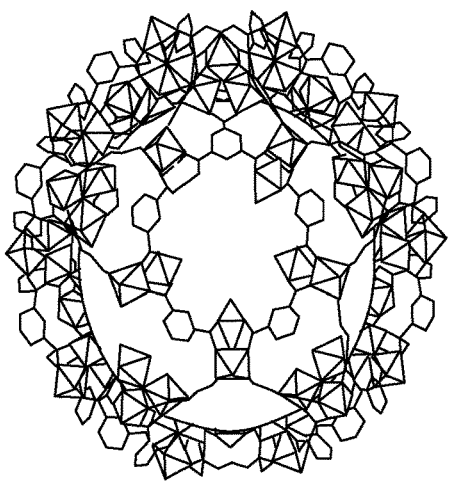
Figure 4:
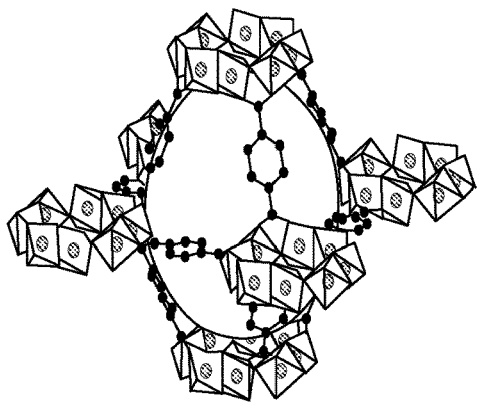
Figure 4:
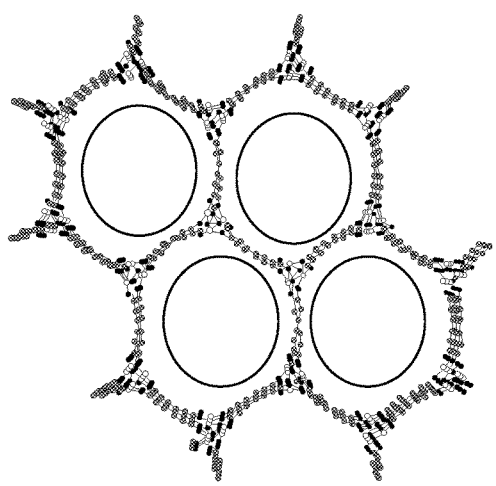
Figure 4:
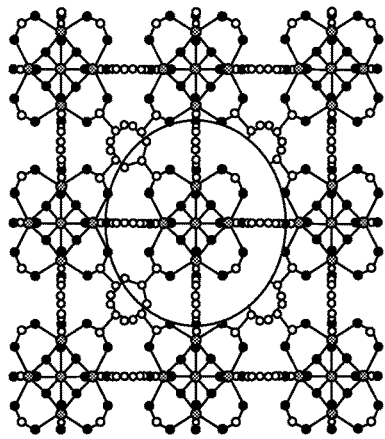

Considering the novel results mentioned above, we continued to further develop this chemistry with MIL-100 and several other water stable MOFs with varying pore size and structure; frameworks including MIL-101, $M_2$(dobdc), $M_2$(dobpdc), M-BTTri, Cu-BTTri, (some of which are shown in FIGS. 1 and 4) and M-TDPAT were tested before and after the appendage of a wide range of small molecules (a small library is shown in FIG. 1). Variations in frameworks unveiled the role that the pore size, shape, and density of adsorption sites might play in a frameworks ability to extract heavy metal-ions from solution. Further, the Lewis base sites of the appended molecules were varied between amines, hydroxyls, carboxylates, or thiols, to unveil the knowledge necessary to tune the host-guest interactions.

Changing the hard/soft character of the appended molecules along with the number of available binding sites provided variability in the binding strength and hence induce framework selectivity for heavy metal adsorption. As an example, $Hg^{2+}$ interacts strongly with thiols in biochemical systems, and due to its softer nature, relative to hydroxyls and amines, MOFs with thiol functionality bind large polarizeable metals over harder ones, like $Mg^{2+}$, $Ca^{2+}$, and $Na^+$, that are also often present in water. This exclusion will enhance the overall capacity, compared to materials that offer no selectivity. Further, surface appended molecules that can offer multifunctional properties, such as luminescence, might spur other technologies, like the development of cheap sensors that can be used in a variety of applications related to quantifying or identifying the presence of heavy metals. This would be beneficial to multiple industries such as those coupled to energy production, wastewater treatment, agriculture, and medicine. In these instances techniques, such as absorption and fluorescence spectroscopy will additionally be employed to understand the materials absorption and emission spectra pre- and post-binding the aforementioned heavy metals. This area of interest has yet to be pursued in MOFs to the best of our knowledge.

$M_2$(dobdc) described by Rosi et. al., "Rod Packings and Metal—Organic Frameworks Constructed from Rod-Shaped Secondary Building Units." *Journal of the American Chemical Society* 2005, 127 (5), 1504-1518; and Dietzel, et. al., "Structural Changes and Coordinatively Unsaturated Metal Atoms on Dehydration of Honeycomb Analogous Microporous Metal—Organic Frameworks." *Chemistry—A European Journal* 2008, 14 (8), 2389-2397; and Caskey et. al., "Dramatic Tuning of Carbon Dioxide Uptake via Metal Substitution in a Coordination Polymer with Cylindrical Pores." *Journal of the American Chemical Society* 2008, 130 (33), 10870-10871.

$M_2$(dobpdc) described by Vlaisavljevich, et. al. "CO2 induced phase transitions in diamine-appended metal-organic frameworks." *Chemical Science* 2015, 6 (9), 5177-5185, and McDonald, et. al. "Cooperative insertion of CO2 in diamine-appended metal-organic frameworks." *Nature* 2015, advance online publication.

M-BTTri, Cu-BTTri, described by Demessence, et.al. "Strong CO2 Binding in a Water-Stable, Triazolate-Bridged Metal—Organic Framework Functionalized with Ethylenediamine." *Journal of the American Chemical Society* 2009, 131 (25), 8784-8786.

M-TDPAT described by Li, B. at. Al. "Enhanced Binding Affinity, Remarkable Selectivity, and High Capacity of CO2 by Dual Functionalization of a rht-Type Metal—Organic Framework." *Angewandte Chemie International Edition* 2012, 51 (6), 1412-1415.

A Multivariate Approach to Metal Scavenging MOFs.

With the high capacity that we have already observed, which results from light weight MOF structures combined with their modular, crystalline nature, it might be possible to use a multivariate approach, originally taken by Yaghi and co-workers to enhance gas adsorption capacities, to water adsorption. For this approach, combinations of different surface functionalities can be employed to optimize frameworks for predetermined wastewater mixtures. While this feat is not easily accomplished with current heavy metal adsorbents, decorating the surface of a MOF with many combinations of different metal scavenging surface appended moieties should be feasible. Parent structures with each surface appendage will first be explored and then we will attempt to make MOFs with a cocktail of different chelating moieties. After surface appendage, washing via soxhlet extraction, and subsequent framework digestion, linker ratios will be determined using techniques like NMR and/or aerosol time-of-flight mass spectrometry.

MOF Struts with Functional Groups that Bind and Extract Heavy Metals from Water.

The third part of the work focused on the synthesis of organic ligands with carboxylate functionality on each end and a Lewis base functionality in the center (see FIG. 1). There are a few reported struts that offer bypiridine, catechol, dithiol functionality, etc. While most of these have been employed to systematically study catalytic properties in MOFs with surface appended metal complexes, they could also be employed for the purpose of water treatment. From these ligands, isoreticular analogs of water stable frameworks were synthesized such as MIL-101 described by Ehrenmann, et. al. "Water Adsorption Characteristics of MIL-101 for Heat-Transformation Applications of MOFs" *European Journal of Inorganic Chemistry* 2011, 2011 (4), 471-474; and Jeremias, et. al. "MIL-100(Al, Fe) as water adsorbents for heat transformation purposes-a promising application. *Journal of Materials Chemistry* 2012, 22 (20), 10148-10151". $NH_2$-MIL-125 described by Kim, et. al., "Adsorption/catalytic properties of MIL-125 and NH2-MIL-125" *Catalysis Today* 2013, 204, 85-93. UIO-66 described by Gomes et. al. "Water stable Zr-benzenedicarboxylate metal-organic frameworks as photocatalysts for hydrogen generation" *Chemistry—A European Journal* 2010, 16 (36), 11133-11138, and Yang, et. al., "A water stable metal—organic framework with optimal features for CO2 capture." *Angewandte Chemie* 2013, 125 (39), 10506-10510 (see FIGS. 1 and 4) and UIO-67 described by Cavka, et. al. "A New Zirconium Inorganic Building Brick Forming Metal Organic Frameworks with Exceptional Stability" *Journal of the American Chemical Society* 2008, 130 (42), 13850-13851.

The MIL-101 structure type, which exhibits $M_3O$ (M=$Cr^{3+}$, $Fe^{3+}$, $Al^{3+}$) trimers interlinked by 1,4-benzenedicarboxylate struts (see FIG. 1), has reported water stability (in the $Al^{3+}$ analog) and contains OMCs. As such, we will use frameworks like this one to employ both surface appended molecules (panel b) and metal scavenging struts (panel c) to further improve the capacities and tailorability of the framework's metal adsorption properties. This combination will allow optimal capacities to be achieved and more surface tunability for potential customization of MOF surfaces for predefined wastewater mixtures.

While it is noted that the MIL-101 structure type has not yet been formed with the proposed struts (panel c), we expect that the substitution will be successful because the proposed ligands have the same connectivity as 1,4-benzenedicarboxylate found in MIL-101-Fe. It is therefore expected that the proposed ligands will form isoreticular structures, methodologies previously demonstrated by Yaghi et al.

General Characterization of Water Adsorbents.

Various techniques such as IR, NMR, XPS, and X-ray absorption spectroscopy (XAS) will be used to unveil the binding mechanism of surface appended molecules and the heavy metals ions. While most of the characterization techniques are available in house, for XAS, user proposals will be written to acquire beamtime at local x-ray scattering facilities. This technique will allow us to probe the absorption edges of the atoms involved in binding and as such, potentially elucidate coordination environments. Heavy metal extraction will be carried out in deionized water, fresh water from local rivers and streams, and seawater. The tests will be performed with many metals (and combinations thereof) including $Hg^{2+}$, $Cd^{2+}$, $Pb^{2+}$, $As^{3+}$, $Cr^{6+}$, $Zn^{2+}$, $Ni^{2+}$, and $Cu^{2+}$, all of which are common contaminates in water sources throughout the world. And then the extraction results will also be compared to those obtained from the bare framework. To gain a better perspective of whether materials are good prospects for implementation in wastewater treatment or in home purification systems, other properties such as long-term stability, rate of adsorption, and reversibility will be probed. The latter will be carried out via post chelation treatment with various additives, common methodologies that have been previously developed.

Further studies will be done to elucidate the role that pH and temperature plays in the materials performance (pH 1 to 14 and 25° C. to 65° C.). Variable temperature isotherms for heavy metal adsorption (25° C. to 65° C.) will be collected to extract important thermodynamic parameters related to isosteric heat of sorption, rate constants of adsorption, and activation energy. Additional effort will be made to simulate the presence of well-known organic interferents, such as humic acid, through its addition to fresh water solutions being tested. The cyclability of the materials overtime will be probed to determine whether the organic entities begin to clog the pores or are adsorbed, which can be further supported with surface area measurements, pore volume determinations, combustion analysis, and TGA, as materials are cycled. When possible, crystallography techniques will be used to probe the location of heavy metal binding sites and hence give insight into the structural features that give rise to enhanced or diminished properties. Once materials are identified as good adsorbents, we will utilize UV-Vis and/or ICP-OES analysis to monitor the kinetics associated with heavy metal adsorption.

These materials could be used by a broad selection of companies for 1) purifying water on the utility scale, 2) home-based water purification, or 3) sensing of heavy metal ions.

Various embodiments of the invention describe a composition of matter for selective binding of at least one heavy metal comprising at least one porous metal-organic framework (MOF) with unsaturated coordination sites, at least one organic ligand functionalized with at least one functional group tailored to bind to the at least one MOF, and at least one separate functional group tailored to bind to the at least one heavy metal.

The composition of matter wherein the at least one MOF comprises MIL-100, MIL-101, MIL-125, $M_2$(dobdc), $M_2$(dobpdc), M-BTTri, Cu-BTTri, M-TDPAT, $NH_2$-MIL-125, UIO-66, UIO-67, or M-BTTri.

The composition of matter wherein the at least one MOF is treated with at least one binder to adjust particle properties comprising size or hardness.

A device comprising the composition of matter wherein water is flowed across a packed bed of the composition of matter.

A device comprising the composition of matter wherein the composition of matter is incorporated into a membrane, across which water is flowed.

A device comprising the composition of matter wherein the composition of matter is coated onto at least one transducer and the at least one transducer is used to measure the concentration of one or more heavy metals in a water sample.

A device wherein multiple transducers are used to measure the concentration of one or more heavy metals in the water sample.

Functional groups that bind to the MOF: amine (primary, secondary, or tertiary), aniline, thiol, carboxylic acid, pyridine, pyrrole, and hydroxyl groups, phenol groups, catechol groups, etc.

Functional groups that bind to the toxic metal ion: catechol, thiocatechol, dithiocatechol, alcohol, thiol, amide, carboxylic acid, bipyridine, pyrogallol, etc.

Figure 5:
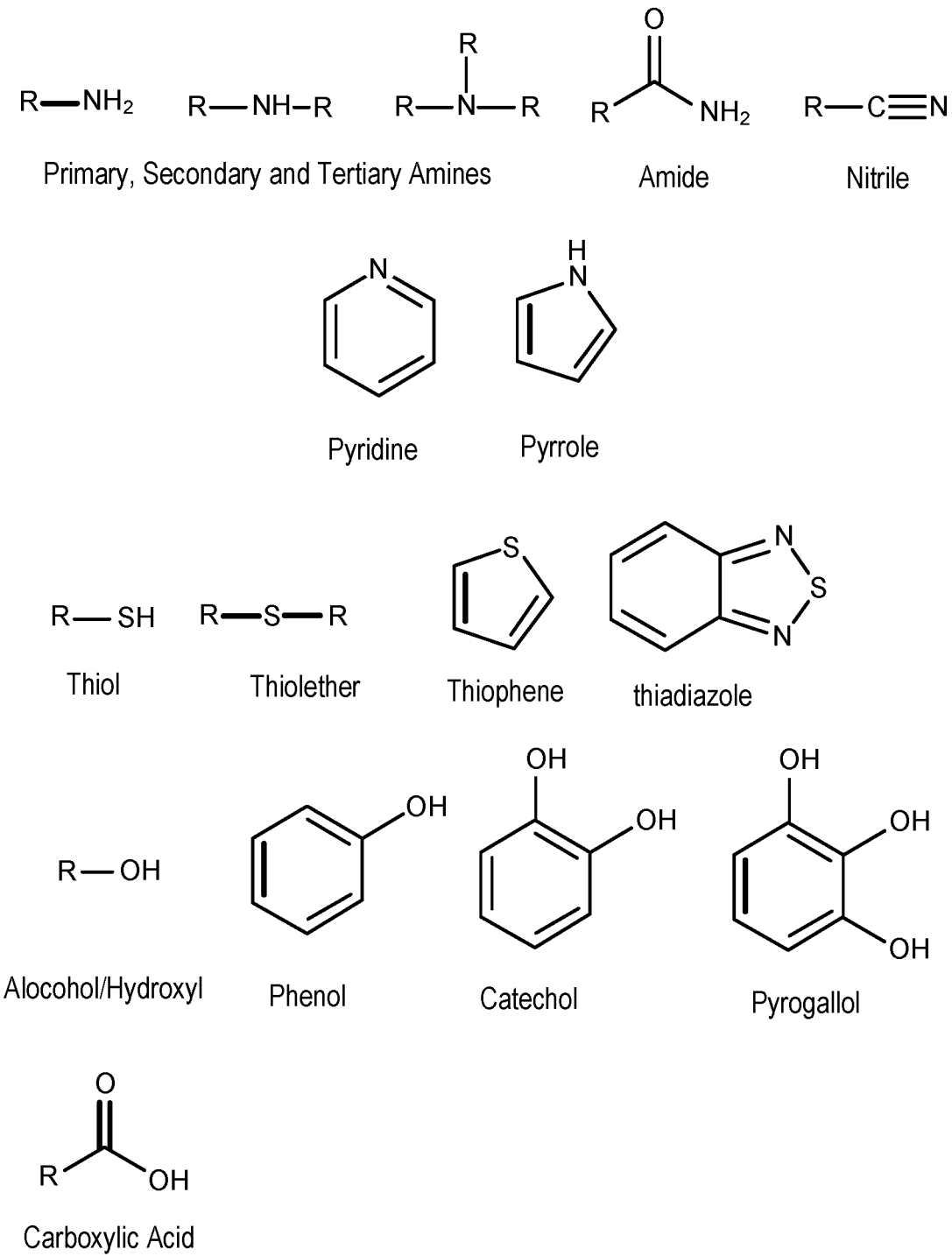
FIG. 5 illustrates functional groups that bind the MOF surface.

Functional groups that bind the MOF surface include those that are shown in FIG. 5.

Figure 6:
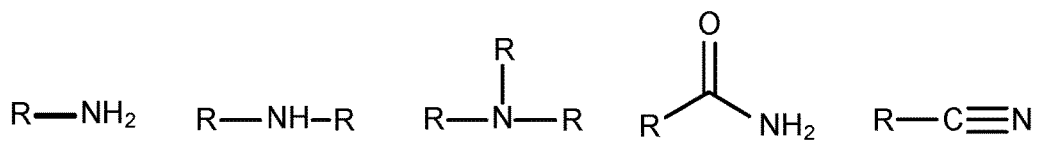
FIG. 6 illustrates functional groups that bind to heavy metals.
Figure 6:
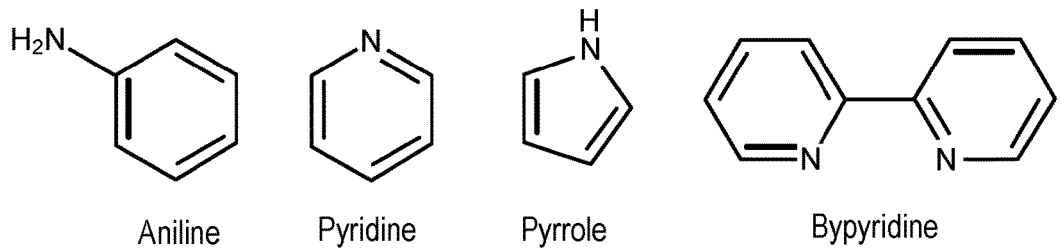
Figure 6:
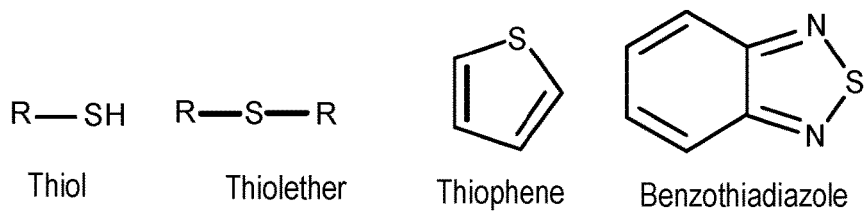
Figure 6:
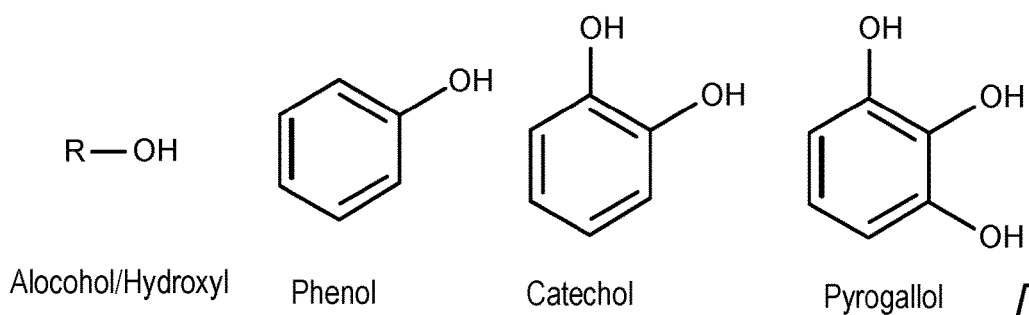
Figure 6:
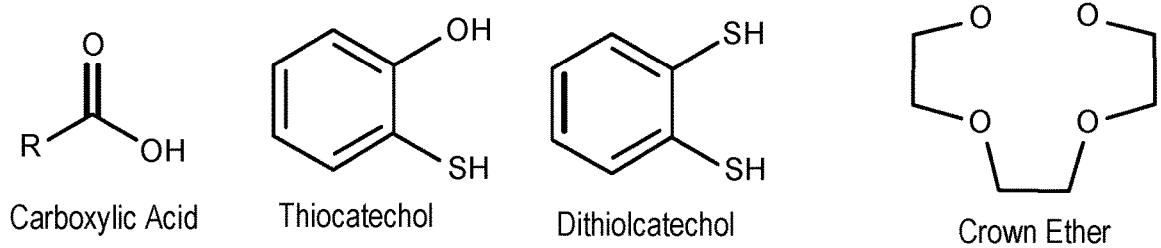
Figure 6:
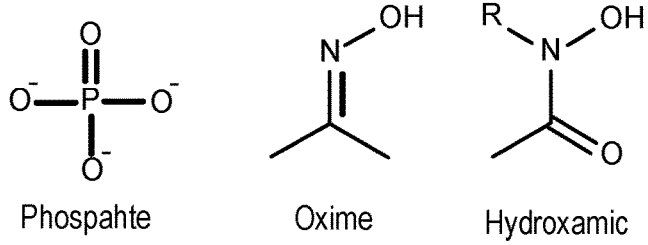

Functional groups that bind the heavy metals include those that are shown in FIG. 6.

Regarding FIGS. 5 and 6, in every case there would be an "R" group, i.e. these would be part of a larger molecule or polymer. The R group is denoted specifically in some cases, but not in others.

Regarding FIG. 5, there are other cyclic compounds, macrocycles, like porphyrins, cyclodextrins, and crown ethers that chelate metals, these groups may also possess OH and NH functionality as well.

Liquids includes both aqueous and nonaqueous. Liquids may be aqueous, though they may have different compositions. For example, drinking water, biological fluids, electroplating fluids, fracking wastewater, water contaminated by other industrial processes. Nonaqueous fluids may include waste from pharmaceutical production or industrial chemical processes using organic solvents and some heavy metal catalyst or reagent.

What is claimed is:

1. A composition of matter operable for selective binding of a heavy metal, compromising:
    a porous metal-organic framework (MOF) with unsaturated coordination sites;
    an organic polymer ligand functionalized with a first functional group tailored to bind to the MOF; and
    a second functional group tailored to bind to the heavy metal.

2. The composition of matter of claim 1, wherein the MOF comprises MIL-100, MIL-101, MIL-125, M(dobdc), M2(dobpdc), M-BTTri, Cu-BTTri, M-TDPAT, NH2-MIL-125, UiO-66, UiO-67, or M-BTTri.

3. The composition of matter of claim 1, wherein the MOF is treated with a binder to adjust particle properties comprising size or hardness.

4. The composition of matter of claim 1, wherein the first functional group is selected from a group consisting of an aniline, a thiol, a pyridine, a pyrrole, phenol groups, catechol groups and/or their combinations.

5. The composition of matter of claim 1, wherein the second functional group is selected from a group consisting of a catechol, a thiocatechol, a dithiocatechol, an alcohol, a thiol, an amide, a carboxylic acid, a bipyridine, and a pyrogallol.

6. The composition of matter of claim 1, wherein the first functional group on the polymer is a Lewis base, Lewis acid, or a molecular complex.

7. The composition of matter of claim 6, wherein the first functional group is selected from the group consisting of a Lewis acid, a Lewis base, a haloalkane, an alcohol, an aldehyde, a ketone, a carboxylic acid, an acid anhydride, an acylhalide, an ester, an ether, an epoxide, an amine, an amide, a nitrate, a nitrite, a nitrile, a nitro, a nitroso, an imine, an imide, an acid, a cyanate, an isocyanate, a thiol, a sulfide, a disulfide, a sulfoxide, a sulfone, a sulfinic acid, a sulfonic acid, a sulfonate ester, a thiocyanate, an isothiocyanate, a thial, a phosphine, an aniline, a pyridine, a pyrrole, a phenol group, a catechol group, or a combination thereof.

8. The composition of matter of claim 6, wherein the first functional group is selected from the group consisting of an alcohol, a carboxylic acid, an ether, an amide, a nitrile, a thiol, an aniline, a pyridine, a pyrrole, a phenol groups, a catechol group, or a combination thereof.

9. The composition of matter of claim 1, wherein the second functional group on the polymer is a Lewis base, Lewis acid, or molecular complex.

10. The composition of matter of claim 9, wherein the second functional group is selected from the group consisting of a Lewis acid, a Lewis base, a haloalkane, an alcohol, an aldehyde, a ketone, a carboxylic acid, an acid anhydride, an acylhalide, an ester, an ether, an epoxide, an amine, an amide, a nitrate, a nitrite, a nitrile, a nitro, a nitroso, an imine, an imide, an acid, a cyanate, an isocyanate, a thiol, a sulfide, a disulfide, a sulfoxide, a sulfone, a sulfinic acid, a sulfonic acid, a sulfonate ester, a thiocyanate, an isothiocyanate, a thial, a phosphine, an aniline, a pyridine, a pyrrole, a phenol group, a catechol group, or a combination thereof.

11. The composition of matter of claim 1, wherein the MOF/organic polymer ligand composite is treated with a binder to adjust particle properties comprising size or hardness.

12. The composition of matter of claim 1, wherein the MOF is stable in water.

13. The composition of matter of claim 1, wherein the heavy metal is a metal selected from the group consisting of a rare earth metal, a precious metal, a radioactive metal, or a platinum group metal.

14. The composition of matter of claim 1, wherein the second functional group comprises an absorption site configured to bond with a particular heavy metal.

15. The composition of matter of claim 1, wherein the polymer is redox active.

16. A composition of matter operable for selective binding of a heavy metal, compromising:
    a porous metal-organic framework (MOF) with unsaturated coordination sites, the MOF being treated with a binder to adjust particle properties comprising size or hardness;
    an organic polymer ligand functionalized with a first functional group tailored to bind to the MOF; and
    a second functional group tailored to bind to the heavy metal.

17. The composition of matter of claim 16, wherein the MOF is selected from the group consisting of MIL-100, MIL-101, MIL-125, M(dobdc), $M_2$(dobpdc), M-BTTri, Cu-BTTri, M-TDPAT, NH2-MIL-125, UiO-66, UiO-67, and M-BTTri.

18. The composition of matter of claim 16, wherein the first functional group is selected from the group consisting of an aniline, a thiol, a pyridine, a pyrrole, a phenol group, a catechol group and combinations thereof.

19. The composition of matter of claim 16, wherein the second functional group is selected from a group consisting of a catechol, a thiocatechol, a dithiocatechol, an alcohol, a thiol, an amide, a carboxylic acid, a bipyridine, and a pyrogallol.

* * * * *